United States Patent [19]

Breen et al.

[11] Patent Number: 5,005,130
[45] Date of Patent: Apr. 2, 1991

[54] TRAILER SWING CONTROL

[75] Inventors: Michael T. Breen, Garden City; Jeffrey H. Skorupski, Brighton, both of Mich.

[73] Assignee: Eaton Corporation, Cleveland, Ohio

[21] Appl. No.: 454,095

[22] Filed: Dec. 20, 1989

[51] Int. Cl.$^5$ .............. G06F 7/70; G06F 15/48; B06T 13/00; B06T 8/74
[52] U.S. Cl. .............. 364/426.01; 364/426.02; 364/424.05; 303/7; 303/93; 303/97
[58] Field of Search ........ 303/7, 20, 24.1, 93, 303/95, 97, 103; 364/424.01, 424.05, 426.01, 426.02

[56] References Cited

U.S. PATENT DOCUMENTS

| | | | |
|---|---|---|---|
| 3,618,983 | 11/1971 | Forse . | |
| 3,810,521 | 5/1974 | Sparr . | |
| 3,819,234 | 6/1974 | Couchois et al. | 303/20 |
| 3,840,276 | 10/1974 | Jubenville | 303/7 X |
| 3,894,773 | 7/1975 | Cleveland et al. . | |
| 3,993,362 | 11/1976 | Kamins et al. | 303/7 X |
| 4,023,864 | 5/1977 | Lang et al. . | |
| 4,053,033 | 10/1977 | Sisson et al. | 303/7 X |
| 4,254,998 | 3/1981 | Marshall et al. | 303/20 |
| 4,405,145 | 9/1983 | Bergman et al. . | |
| 4,472,778 | 9/1984 | Davis et al. | 364/426.02 |
| 4,620,717 | 11/1986 | Ivony et al. . | |

OTHER PUBLICATIONS

E. C. Mikulcik, "The Dynamics of Tractor—Semitrailer Vehicles: The Jackknifing Problem", S.A.E. Paper No. 710045, Jan. 1971.

Primary Examiner—Parshotam S. Lall
Assistant Examiner—Edward Pipala
Attorney, Agent, or Firm—H. D. Gordon

[57] ABSTRACT

A brake control system/method for preventing or arresting and minimizing trailer-swing (FIG. 6) in an articulated vehicle (10) is provided. The control system/method senses or calculates values indicative of least one time derivative of trailer transverse movement and processes same to sense conditions indicative of an incipient or initial trailer brake induced trailer-swing event.

12 Claims, 6 Drawing Sheets

TRAILER SWING CONTROL

BACKGROUND OF THE INVENTION

Related Applications

This application is related to U.S. Ser. No. 454,110 titled Trailer Anti-Swing System and Control, U.S. Ser. No. 454,109 titled Trailer Brake Anti-Swing System and Method, U.S. Ser. No. 454,096 titled Articulation Angle Sensor, U.S. Ser. No. 454,602 titled Tractor Trailer Anti-Trailer Swing System and Method, and U.S. Ser. No. 454,574 titled Tractor Trailer Articulation Control System and Method, all assigned to the assignee of this application and filed the same day (Dec. 20, 1989) as this application.

1. Field of the Invention

The present invention relates to a control system/method for controlling the braking force applied to the brakes of a towed subvehicle in an articulated vehicle system, such as the semitrailer subvehicle in a tractor-semitrailer system, to prevent, arrest or to minimize and quickly recover from, the condition known as trailer brake induced trailer swing.

2. Description of the Prior Art

Brake control systems for all types of vehicles, including heavy duty tractor-semitrailer trucks, to improve the stopping and vehicle stability thereof are, of course, well known in the prior art.

Brake systems of the anti-lock type, for all types of vehicles, are well known in the prior art. Briefly, these systems operate to maintain vehicle stability (i.e. acceptable transverse coefficient of friction of braked wheels) by maintaining the longitudinal slip of the braked wheels within predetermined limits. This usually requires modulating the braking forces on an individual wheel and/or individual axle basis to maintain at least some wheel rotation.

Examples of prior art anti-lock brake systems ("ABSs") may be seen by reference to U.S. Pat. Nos. 3,767,270; 3,768,872; 3,854,556; 3,893,696; 3,929,383; 3,929,382; 3,966,267; 4,392,202 and 4,591,213, the disclosures of all of which are hereby incorporated by reference.

Brakes systems which control braking to achieve a driver demand, sense driver demand in a "brake-by-wire" manner, sense coefficient of friction and modify brake forces accordingly, sense load on a wheel and modify braking effort accordingly, sense wheel slip and/or use electronic signals to achieve trailer brake response are also disclosed in the prior art as may be seen by reference to U.S. Pat. Nos. 4,140,352; 4,327,414; 4,494,199; 4,512,615; 4,545,240; 4,591,213; 4,606,586; 4,616,881; 4,648,663 and 4,768,840, the disclosures of which are hereby incorporated by reference.

Brake systems for heavy duty articulated vehicles such as tractor-semitrailer trucks are difficult to design as the loading and maintenance will vary in a truck, such as the loading on the tractor of a tractor-trailer which may comprise a tractor only, a tractor with an empty or lightly loaded trailer or a tractor with a heavily loaded trailer.

Further, tractor-semitrailers are, by their nature, capable of exhibiting certain unstable dynamic behaviors known as jackknife and trailer swing, each of which has its own characteristic cause, effect and appropriate sequence of corrective action. Jackknife is sometimes called "tractor brake caused jackknife" while trailer swing is sometimes called "trailer brake caused jackknife".

The dynamics of undesirable trailer articulation events, such as a jackknife event, are discussed in SAE Paper No. 710045, the disclosure of which is hereby incorporated by reference.

Various systems to prevent or minimize undesirable trailer articulation have been proposed. These include mechanical devices such as chains or variable pivot resistance devices and also wheel speed sensors and anti-lock controls on the trailer per se. Examples of these prior art devices may be seen by reference to U.S. Pat. Nos. 3,618,983; 3,810,521; 3,894,773; 4,023,864, 4,405,145 and 4,620,717 the disclosures of which are hereby incorporated by reference.

The prior art devices were not satisfactory as the mechanical devices were somewhat slow to react, hindered required articulation during normal operation, required specially equipped/configured trailers and/or did not allow for a recovery from the locked-in condition. The anti-lock (ABS) type systems were not totally satisfactory as most existing trailers do not have ABS equipment, tractors are often driven with a variety of trailers and thus even if a trailer is provided with ABS equipment, it may not be compatible with the tractor ABS, providing all existing and future trailers with ABS equipment is prohibitively expensive and, under certain conditions, undesirable trailer articulation may occur in the absence of the wheel lock conditions sensed and reacted to by existing ABSs.

SUMMARY OF THE INVENTION

In accordance with the present invention, many of the drawbacks of the prior art have been overcome or minimized by the provision of a trailer anti-swing control system/method which is suitable for use with semitrailers equipped with standard (i.e., non-ABS) brake controls and will control the pilot or actuation pressure supplied to the trailer brake system to halt sensed trailer swing initiation and allow the trailer to safely recover therefrom.

The above is accomplished by providing, an ABS type valve located on the tractor upstream from the glad hand connection, sensors for sensing and/or providing signals indicative of an incipient or initial trailer swing event and a control device, preferably microprocessor based, for receiving input signals, processing same in accordance with predetermined logic rules and issuing command output signals to control the trailer brake ABS type valve.

Preferably, the sensor will be a trailer mounted device for sensing transverse trailer position and velocity and/or acceleration. For a more responsive control, higher order time derivatives may be used. The "ABS type valve" should have the functions of lowering pressure to release the trailer brakes, holding the pressure at a low value to maintain brakes released, then reapplying the brakes in a controlled manner to a desired reapply pressure, all independent of the degree of braking effort demanded by the vehicle driver.

Accordingly, it is an object of the present invention to provide an improved trailer brake control system/method for the trailer type subvehicle of an articulated vehicle system, such as the trailer of a tractor-semitrailer truck system, which is operative to detect the onset of and prevent, or to minimize and allow recovery from, a trailer swing condition.

This and other objects and advantages of the present invention will become apparent from a reading of the detailed disclosure of the preferred embodiments taken in connection with the drawings.

DESCRIPTION OF THE PREFERRED EMBODIMENT

Figure 1:
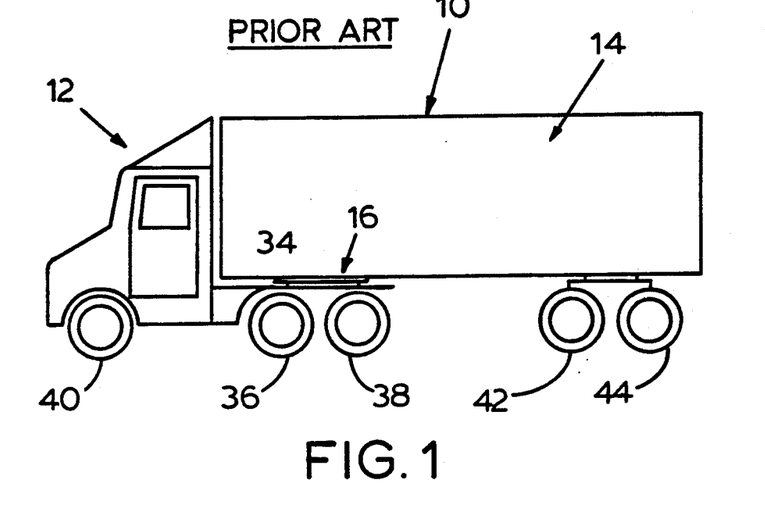
FIG. 1 is a schematic illustration of a conventional heavy duty tractor-semitrailer truck articulated vehicle.

The trailer anti-swing control system/method of the present invention is applicable to articulated multiple vehicle systems such as the tractor-semitrailer system 10 illustrated in FIG. 1. Briefly, as is well known to the prior art, the tractor-semitrailer system 10 comprises a tractor 12 and a semitrailer 14 attached thereto by a connecting means 16 which comprises the well known fifth wheel 34 fixed to the tractor for selective engagement with a king pin fixed to the trailer. The tractor typically comprises a pair or tandem set of rear drive axles 36 and 38 and a front steer axle 40. The trailer 14 typically comprises a tandem pair of non-steerable, non-driven trailer axles 42 and 44. Typically, but not necessarily, the front axle 40 will have non-driven steerable wheels. The tractor and/or the trailer may be equipped with single axles or three or more axles.

The ability to utilize fifth wheel/king pin connections to relatively quickly and easily couple or connect standardly equipped tractors to standardly equipped semitrailers in an articulated or pivoted manner provides the well appreciated advantages of commercial and operational flexibility as well as increasing the maneuverability of the vehicles. However, under certain conditions, often associated with braking while negotiating a curve or a turn, one or both of the tractor-semitrailer subvehicles may lose transverse stability resulting in a condition of uncontrolled excessive articulation, i.e. jackknife or trailer swing. Tractor-semitrailer uncontrolled excessive articulation is generally considered to consist of two distinct types of events, namely "jackknife" and "trailer swing", both of which may lead to catastrophic results.

Jackknifing, which is considered to be the most severe and least correctable type of uncontrolled excessive trailer articulation event, usually results from the tractor subvehicle, usually the tractor subvehicle drivewheels, losing transverse stability, often while cornering, which lack of stability is quickly compounded by the often relatively many times greater inertia imposed by the trailer. The other type of uncontrolled excessive trailer articulation event, trailer swing, is generally the result of the trailer wheels, 42 and 44, losing transverse stability usually while cornering resulting in the trailer swinging radially outwardly relative to the center of the curve being negotiated which may result in the trailer swinging into adjacent traffic lanes with the obvious potential for catastrophic results therefrom.

Trailer swing events often occur less rapidly than the jackknife events, and upon sensing conditions indicative of the advent of a trailer swing condition corrective action may be taken of the trailer brakes to minimize the extent of trailer swing and to cause the trailer to resume its tracking condition.

As is very well known, decreasing the slip of a tire will dramatically increase the transverse coefficient of friction thereof. Accordingly, trailer swing induced by locked or almost locked trailer brakes, if sensed at the onset or initiation thereof, may be arrested or reduced by increasing the transverse stability of the trailer wheels by releasing the brakes thereof and allowing the wheels to roll up to or towards vehicle speed. The schematic illustration of an extreme trailer swing event may be seen by reference to FIG. 6 wherein the trailer at the right-hand portion of the illustrated curve has swung totally out of its lane. The purpose of the control system/method of the present invention is to prevent the occurrence of, or to minimize the extent of, trailer brake induced trailer swing events.

The trailer anti-swing control system/method of the present invention is preferably utilized with a tractor 12 fully equipped with an ABS system and a trailer 14 equipped with a standard, i.e. non-ABS, brake system. However, the control of the present invention would also provide benefits if utilized with a vehicle having both tractor and trailer ABS as, under certain conditions, undesirable trailer articulation may occur even though the vehicle wheels have not locked up to the extent that is necessary to cause corrective action by currently existing ABS systems. Additionally, although not preferred, the trailer anti-swing control system/method of the present invention will provide a degree of improved vehicle stability when utilized on a tractor trailer system wherein neither the tractor nor the trailer was provided with an ABS logic control.

As stated above, the purpose of the present invention is to prevent or minimize trailer brake induced trailer swing events while the occurrence of jackknife events is minimized by the provision of the tractor ABS control logic and devices.

Figure 2:
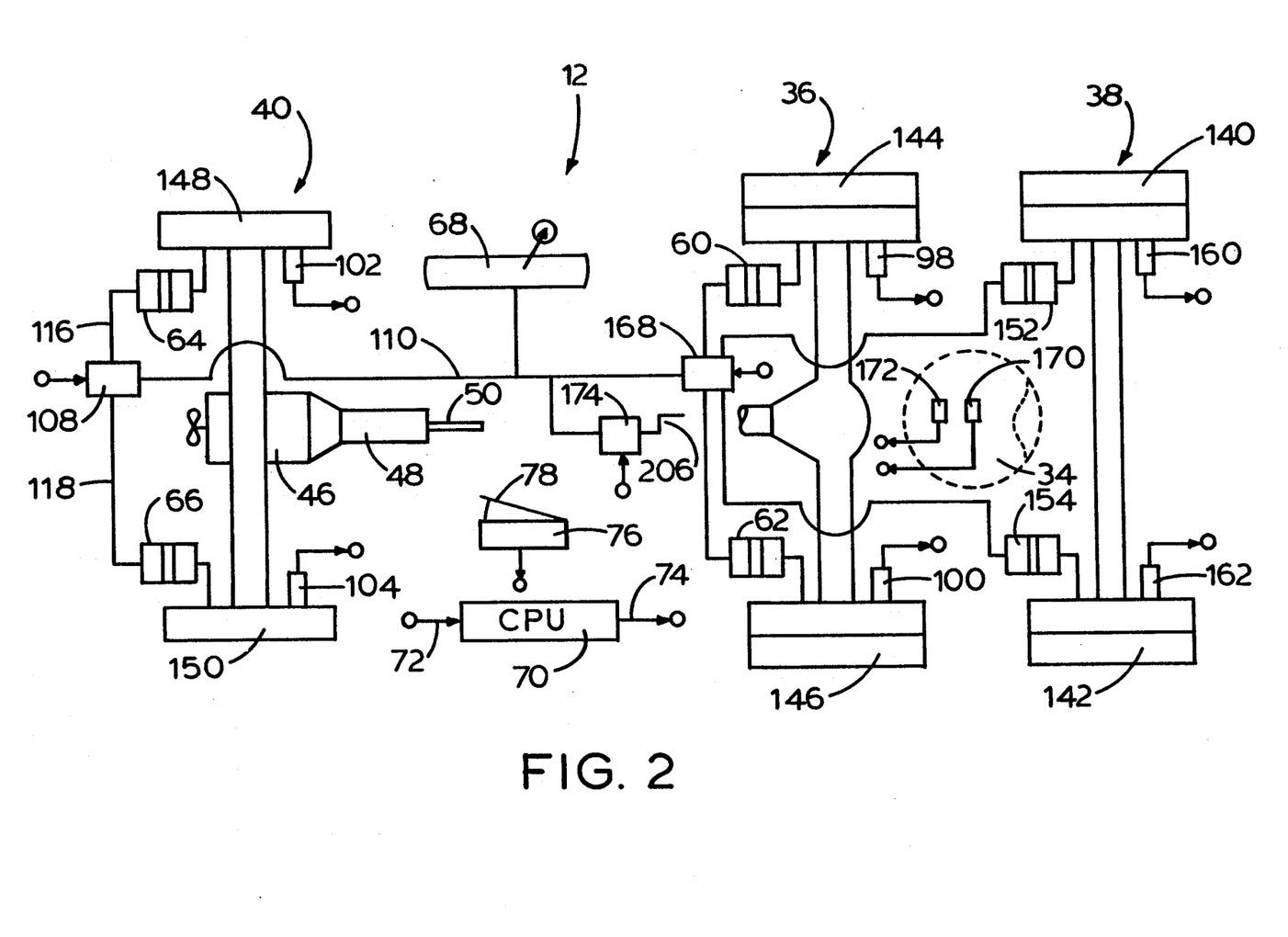
FIG. 2 is a schematic illustration of a tractor mounted brake control system including an anti-lock brake system, and also incorporating the trailer anti-swing control system of the present invention.

A braking system for the tractor 12 of an articulated tractor-semitrailer system 10 which utilizes the trailer anti-swing control system/method of the present invention may be seen by reference to FIG. 2. It is noted that while the braking system for tractor 12 illustrated in FIG. 2 is of the "brake by wire" type, the present invention is equally applicable to other types of brake controls and ABS systems.

Briefly, as is well known in the prior art, tractor 12 includes a front steer axle 40, which is usually not driven, and a tandem pair of rear drive axles comprising front-rear drive axle 36 and rear-rear drive axle 38. Wheels 140 and 142 are associated with the rear-rear drive axle 38, wheels 144 and 146 are associated with the front-rear drive axle 36 and wheels 148 and 150 are associated with the front steer axle 40. The rear drive axles, 36 and 38, are driven by engine 46 through transmission 48 and driveline 50.

Air actuated brake chambers 60, 62, 152, and 154 are provided for retarding the rotation of wheels 144, 146, 140 and 142, respectively. The rear brakes 60, 62, 152 and 154 are, as is well known in the prior art, of the same size and type as likewise are the front brakes 64 and 66 which are provided for selectively braking the rotation of front steer drive axle wheels 148 and 150, respectively. In the system illustrated, the brakes are air actuated brakes of one of the well known types, such as the "S" cam actuated brake type or the air disc brake type, the details of which are well known in the prior art and may be seen in greater detail by reference to U.S. Pat. Nos. 4,476,968 and 4,457,407, the disclosures of both of which are hereby incorporated by reference. While all of the front brakes and all of the rear brakes should be of the same size and type, it is not necessary, and is not preferable, that the front and rear brakes be of the same size. Compressed air for actuating the brakes is supplied from a plurality of supply tanks 68, only one of which is shown, which supply tanks are provided with compressed air from the vehicle onboard compressor (not shown) or the like.

The braking system includes a control unit 70, which for purpose of flexibility and responsiveness is preferably an electronic microprocessor based control unit having means 72 for receiving a plurality of input signals, means for processing input signals in accordance with predetermined logic rules, and means 74 for issuing command output signals to various system operators.

A sensor 76 senses the operator's displacement of a brake pedal 78 to provide an input signal indicative of the driver's demand or vehicle stopping effort. Sensors of this type are known in the prior art and may be seen by reference to above-mentioned U.S. Pat. Nos. 4,140,352; 4,327,414 and 4,512,615. Typically, such transducers will sense the displacement of and/or force applied to the brake pedal 78 and will provide an output signal proportional thereto. As indicated above, the present invention is equally applicable to more conventional brake systems wherein the amount of braking effort is controlled by a well known treadle valve. To provide tractor ABS operation, wheel speed sensors 160, 162, 98, 100, 102, 104 are provided for providing input signals indicative of the rotational speed of wheels 140, 142, 144, 146, 148 and 150, respectively.

The central processing unit 70 will, as is well known in the ABS prior art, process the input signals in accordance with predetermined logic rules to generate command output signals to the front control valve 108 and the rear control valve 168. Briefly, control valve 108 is connected to the supply tank 68 through supply line 110, and, in accordance with the command output signals from CPU 70, independently pressurizes the conduits 116 and 118 leading to air brakes 64 and 66, respectively. Rear control valve 168 is also connected to supply tank 68 through supply line 110 and, in accordance with command output signals from CPU 70, individually provides pressurized fluid via branch conduits to the rear axle brakes 60, 62, 152 and 154. Accordingly, it may be seen that the braking efforts of each of the tractor wheels may be individually controlled for ABS purposes in a closed loop manner in response to command output signals generated by the CPU 70 in response to the input signals received and processed thereby, as is known ABS technology.

To provide the trailer anti-swing control system/method of the present invention, the tractor braking system is also provided with one or more sensors 260, preferably mounted on the trailer, for sensing trailer transverse position (preferably of the rear portion of the trailer) and/or a time derivative thereof, and for providing signals to the CPU 70 indicative thereof. Of course, sensors may also be provided for directly sensing one or more of the time derivatives of articulation angle. In addition, a control valve 174, controlled by command outputs from CPU 70, will provide pilot or controls to the standard trailer brake system control valves. Preferably, the control valve 174 is located on the tractor just upstream of one of the gladhand connectors 206. Valve 174 may be replaced by a standard treadle valve having an output proportional to the displacement of brake pedal 78 and an ABS type valve connected in series downstream therefrom.

Applicant's convention for the measurement of articulation angle, and the first and second derivatives thereof with respect to time will be described in greater detail below.

Figure 3:
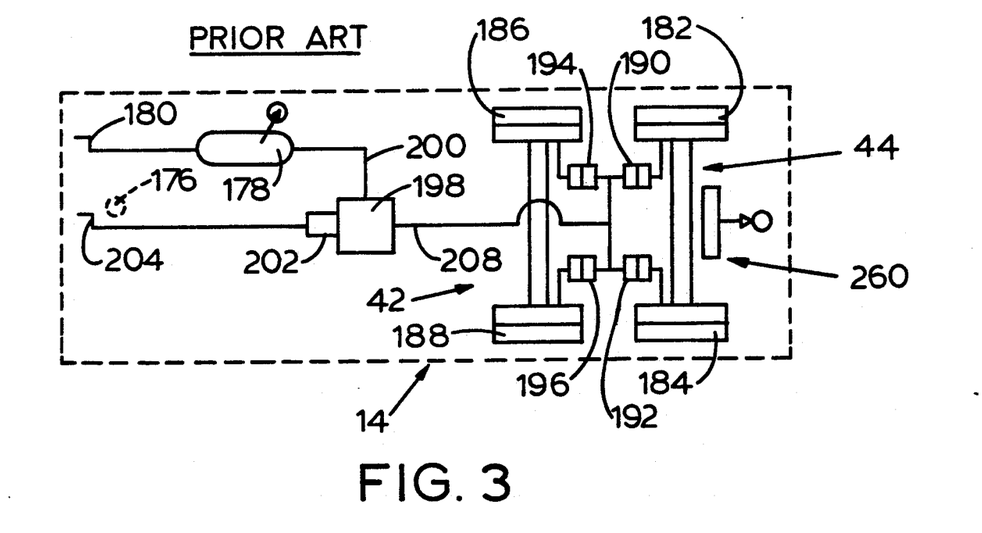
FIG. 3 is a schematic illustration of a standard trailer brake system which may be utilized with the trailer anti-swing brake control system of the present invention.

Referring now to FIG. 3, a prior art standard trailer brake system (i.e, non-ABS) is illustrated. Briefly, the trailer includes a king pin 176 for selective engagement and disengagement to the tractor fifth wheel 34 as is well known in the prior art. The trailer includes a supply tank 178 connected to the tractor air system by means of a fluid connection 180. Trailer axles 42 and 44 support trailer wheels 182, 184, 186 and 188, each of which is provided with an air brake actuators or chambers 190, 192, 194 and 196, respectively. Typically, all of the trailer brakes are controlled at the same pressure by means of a relay valve 198 which has an inlet 200 connected to the trailer supply tank 178 and a pilot valve portion 202 for receiving a pilot air signal from the tractor air system by means of connector 204. Each of the trailer brakes is actuated at approximately the same pressure from a single output 208 from a pilot controlled relay valve 198.

Connector 204 is designed for connection with connector 206 on the tractor. Briefly, the connectors 204 and 206 and likewise connector 180 and its associated connection with a vehicle air system (not shown) form the fluid connection commonly known as the "gladhand".

Figure 4:
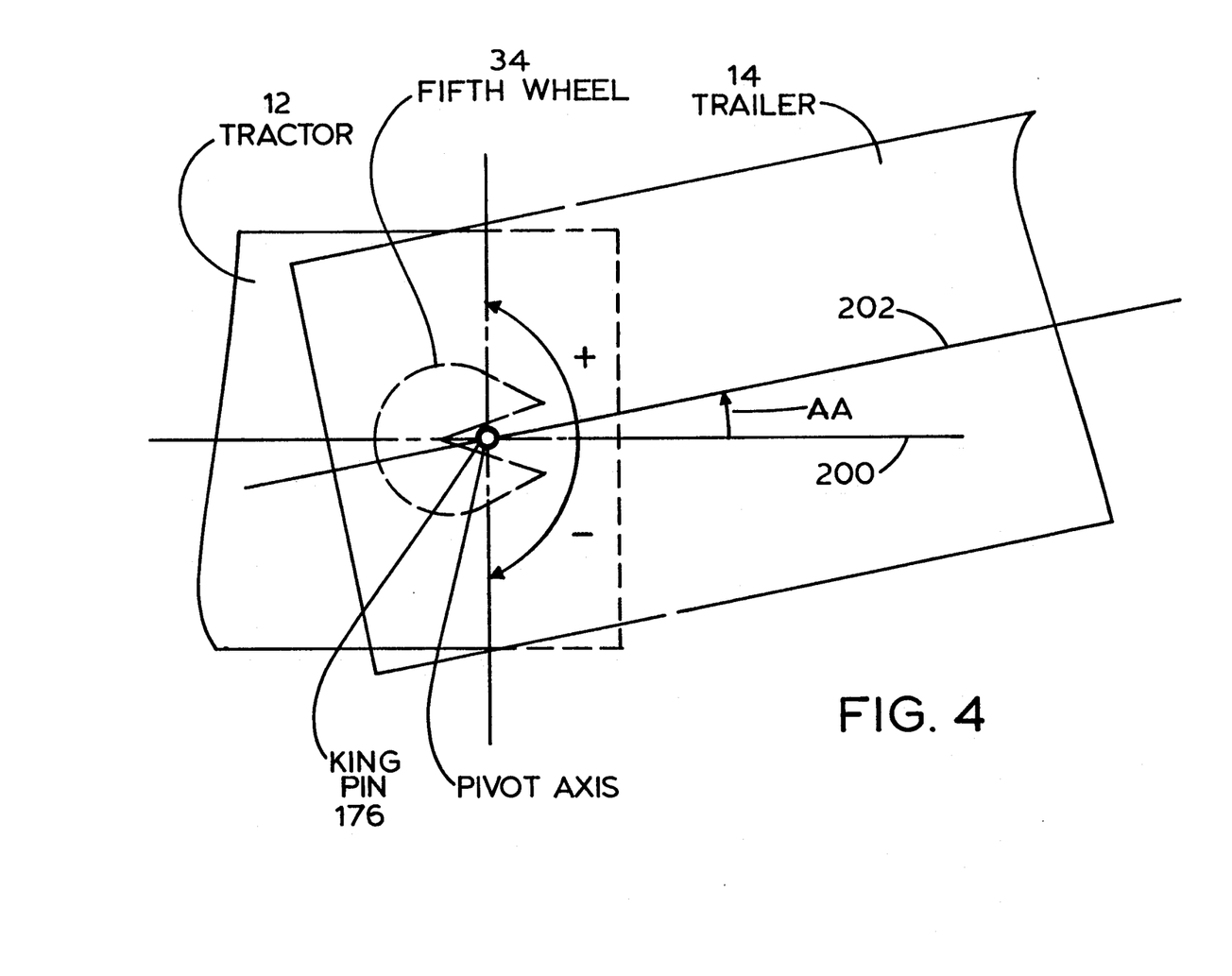
FIG. 4 is an enlarged, fragmentary, schematic illustration of the king pin/fifth wheel pivotal connection between a tractor and a semitrailer illustrating the angular relationship defined by the articulation angle.

Applicant's convention, which will be used throughout this application, for the measure of the articulation angle (AA) may be best understood by reference to FIG. 4 wherein the pivot axis between the tractor 12 and trailer 14 defined by the fifth wheel 34 and king pin 176 connection is viewed from the top of the vehicle, i.e. with the trailer extending rearwardly from left to right as shown in FIG. 4. The articulation angle between the tractor and trailer, AA, is defined as the included angle between the longitudinal axis 200 of the tractor 12 passing through the king pin/fifth wheel pivot axis and the longitudinal axis 202 of the trailer 14 passing through the fifth wheel/king pin pivot axis. The articulation angle AA is measured from the tractor longitudinal axis 200 to the trailer longitudinal axis 202 and is assigned a positive value in the counterclockwise direction and a negative value in the clockwise direction. In the example shown in FIG. 4, accordingly, the articulation angle AA would have a positive value under applicant's herein defined convention.

Of course, a measure of the transverse position of a known portion, such as the rear end, of the trailer is also an indirect indication of articulation angle.

Figure 6:
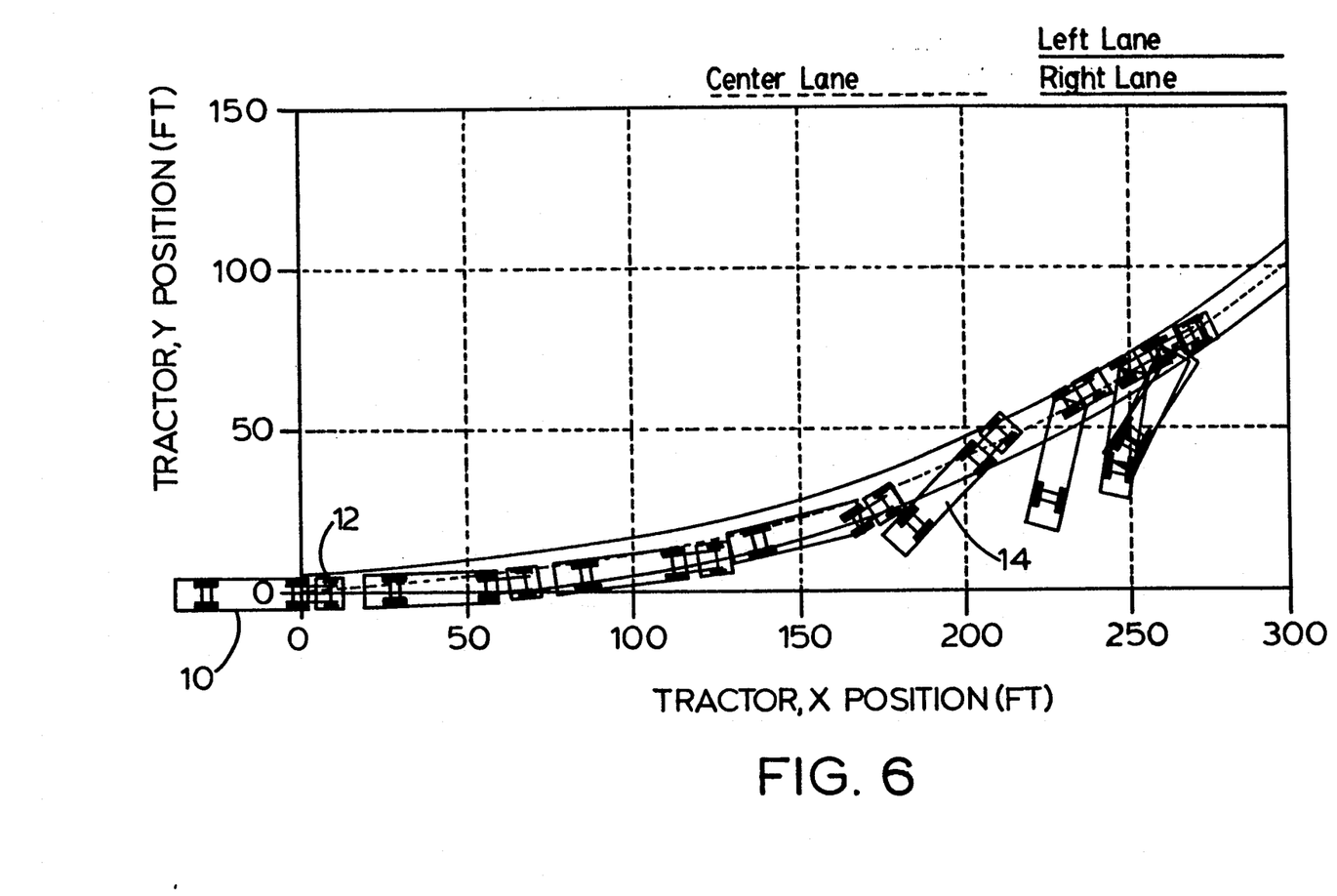
FIG. 6 is a schematic illustration of the occurrence of an uncontrolled trailer swing event.

Referring to FIG. 6, as vehicle 10 moves generally from left to right as seen in FIG. 6 around the corner defined by the curved lane, it may be seen that the wheels of the trailer 14 lose transverse stability and, under the influence of centrifugal force, and a retarding force provided by the tractor itself the trailer 14 will pivot about the king pin such that articulation angle will typically pass through zero, then change signs as the swing out phenomenon progresses. In a trailer swing event, the trailer 14 swinging out of its lane is a potentially hazardous occurrence. This is an example of the type of trailer swing event that the anti-trailer swing control method and control system of the present invention is intended to prevent, arrest, or to minimize and allow rapid recovery from.

The loss of transverse stability of the trailer wheels sufficient to result in a trailer swing event as illustrated in FIG. 6, is typically associated with an application of the trailer brakes resulting in wheel slip exceeding a desirable value and/or total wheel lock. To prevent the occurrence of a trailer brake induced trailer swing event, or to arrest and minimize the extent thereof and to allow quick recovery therefrom, it is desirable that conditions indicative of incipient or actual onset of trailer swing be quickly sensed and that the vehicle brake system react thereto by releasing the trailer brakes allowing the trailer wheels to roll back up towards vehicle speed to minimize the slip and increase the transverse coefficient of friction, and thus increase the centripetal force of the trailer wheels.

The trailer anti-swing control method and system of the present invention is operable to sense conditions indicative of incipient, or the onset of, a trailer brake induced trailer swing event by the sensing and/or calculating, at a time when the vehicle brakes are applied, at least one or more of the trailer portion transverse position and a first or second time derivative thereof. It is important to sense trailer swing at the initiation or onset, i.e. prior to the trailer swinging towards an almost zero articulation angle position, to have sufficient time to arrest and/or minimize the condition. It is also important to distinguish trailer swing from jackknife as different corrective responses are required.

Briefly, one method of sensing an incipient trailer swing event is the sensing of conditions, when the brake pedal is applied, wherein the trailer transverse position and a time derivative thereof are of opposite signs (which is an indication that the trailer 14 is swinging outwardly from the center of a curve which the tractor-semitrailer vehicle is traversing) and the absolute value of the second derivative of the trailer transverse position with respect to time exceeds a predetermined reference indicating that the trailer is swinging rapidly radially outwardly from the center of the curve being traversed by the articulated vehicle.

Upon sensing these conditions, the control logic of the present invention will declare the existence of conditions indicative of an incipient trailer swing event and will release the trailer brakes for a given period of time (T) selected to allow the trailer wheels to roll back up towards vehicle speed to increase the transverse stability thereof and preferably minimize or eliminate the trailer swing and allow the trailer wheels to again track on the curve. After the predetermined period of time, trailer brakes will be reapplied at a rate (R) which may be fixed or may vary with measured system variables to a reapplication pressure (P) which is preferably a function of the value of the first and/or second derivative of trailer transverse position or articulation angle with respect to time at the onset of the trailer swing event. The brakes will be maintained at this pressure peak until such time as the braking event is terminated, i.e., the operator removes his foot from the brake pedal, at which point trailer brakes will again be controlled by the treadle valve until such time as incipient trailer swing is again sensed. The application of pressure to the trailer brakes is controlled by trailer anti-swing control valve 174, an ABS type valve, which varies the pressure applied to the pilot portion 202 of the trailer relay valve 198. A graphic illustration of the pressure applied to the trailer brakes to minimize and recover from a sensed incipient trailer swing event may be seen by reference to FIG. 5.

Figure 5:
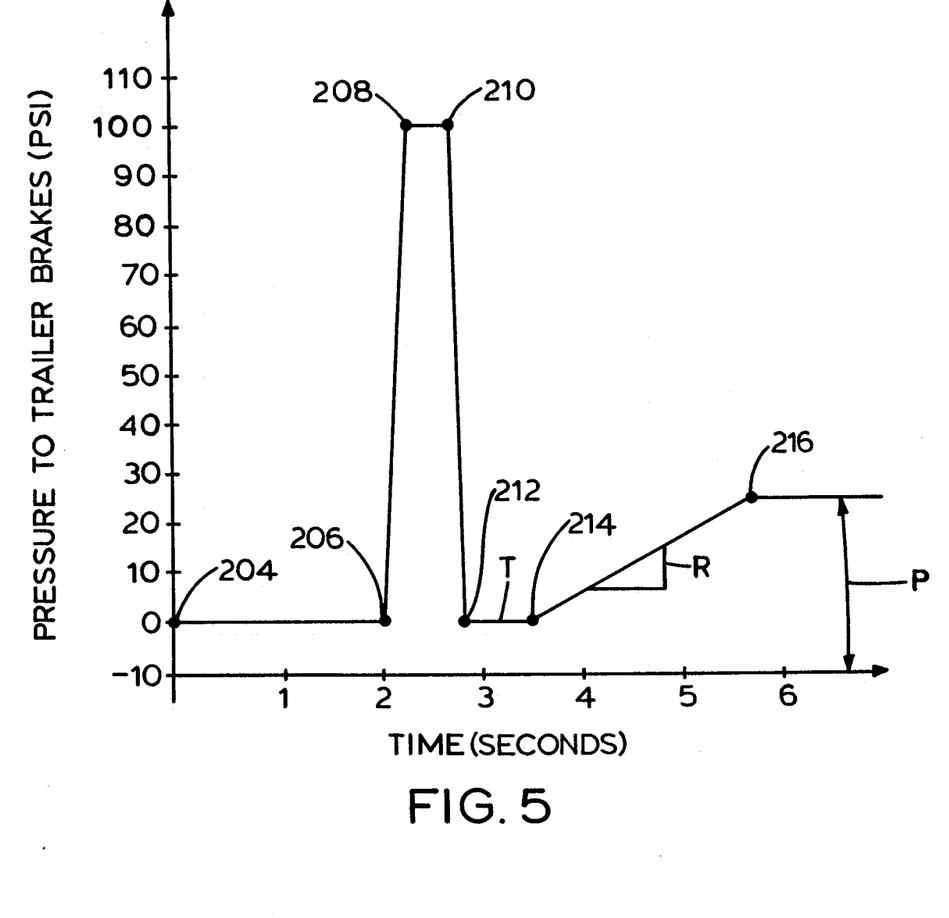
FIG. 5 is a graph illustrating the trailer brake applied pressure versus time curve(s) for the trailer anti-swing control system/method of the present invention.

Referring to FIG. 5, at point 204 to point 206 the vehicle brakes are not applied. At point 206, the vehicle operator has fully depressed the treadle valve or brake pedal 78 causing the relay valve 198 in the trailer, under the control of trailer brake control valve 174, to apply the trailer brakes with a high pressure as seen in point 208. If the operator continues to request a relatively high braking effort, trailer brakes will remain applied at a relatively high level from point 208 to point 210. For purposes of this example, at point 210 it will be assumed that the input signals processed by the CPU controller 70 indicate the existence of an incipient trailer swing event. The CPU 70 will then issue command output signals to the trailer brake control valve 174 causing the trailer brakes to be released as may be seen at point 212. The trailer brakes will be maintained in the released position for a period of time T which is selected as a time sufficient to allow the trailer wheels to near roll back up to vehicle speed. Time T may be predetermined or may vary with the value of sensed inputs to the CPU. Typically, as the trailer wheels are not provided with speed sensors, this is an empirically predetermined value. Applicant has discovered that a period of time from 0.25 to 1.25, preferably from 0.50 to 0.75, seconds is sufficient to allow the trailer wheels to roll back up to approximately vehicle speed and allow the trailer brakes to be reapplied to minimize the stopping distance of the total vehicle 10.

Accordingly, at the end of the predetermined period of time T, i.e., at point 214, the trailer brakes are reapplied at a rate R until a pressure P is achieved at point 216, which pressure P is preferably a function of the sensed or calculated first and/or second derivative of the articulation angle at the onset of the trailer swing event. Vehicle brakes will then be maintained at pressure P until termination of the braking event. Applicants have discovered that a rate of reapply R equal to about 10 PSI per second is an effective rate to achieve the pressure P as rapidly as possible without resulting in a repeat trailer wheel transverse loss of stability.

Reapply pressure P and/or the rate (R) of reapply pressure are, as stated above, a function of the dynamics of the trailer swing event.

Briefly, the absolute values of the first and second time derivatives of articulation angle, or of trailer transverse position, during a trailer swing event are indicative of the loading on the trailer and/or the friction coefficient of the road. The more rapid the change in articulation angle, or of trailer transverse position, and the rate of change of the change of articulation angle, the more lightly loaded is the tailer or the lower the coefficient of friction of the road. Accordingly, for a relatively high first, second and/or higher derivative of articulation angle, or of trailer transverse position, with respect to time, a relatively lower reapply pressure and rate of reapplying pressure is desirable while with a relatively lower first and/or second derivative of articulation angle with respect to time, a relatively higher reapply pressure may be applied to the trailer brakes without fear of causing trailer wheels to again lose transverse stability.

Figure 7:
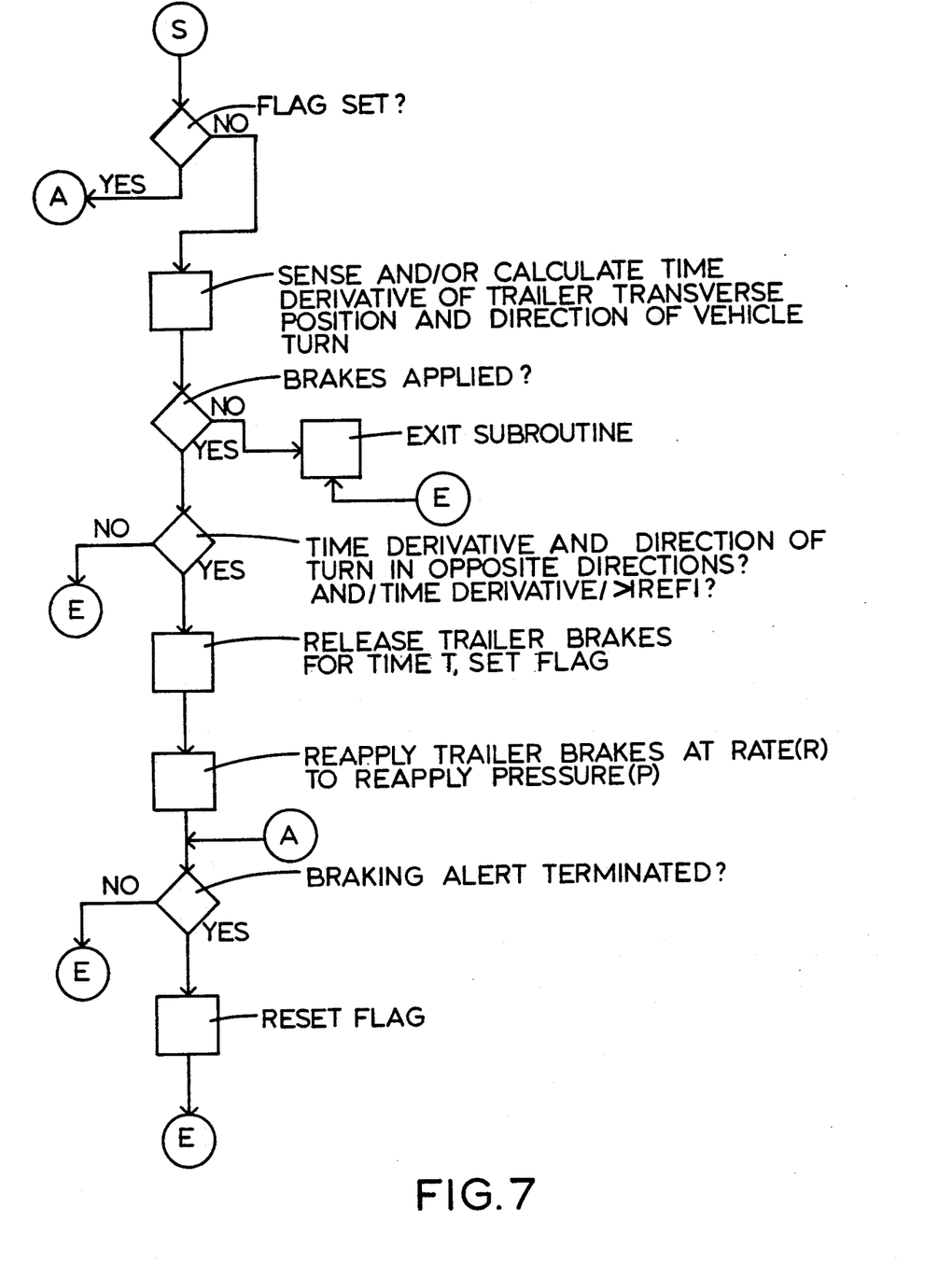
FIG. 7 is a schematic illustration, in the form of a flow chart, of the trailer anti-swing control system/method of the present invention.

The control method of the present invention symbolically illustrated in a flow chart format by reference to FIG. 7.

Alternatively, or in addition to the direct articulation angle sensing methods/systems described above, a transverse velocity or acceleration sensor 260 may be mounted to the tractor 14, preferably adjacent the axles 42 and 44, to provide input signals to controller 70 indicative of an incipient and/or initial trailer swing event. Briefly, if the trailer is transversely accelerating in the opposite direction (radially outwardly) of the curve or turn, and if transverse acceleration exceeds a reference value, an incipient trailer swing event is indicated. As with articulation angle sensing, higher order time derivatives of transverse trailer position or velocity may be utilized as a control parameter.

As may be seen, applicant's have provided an improved trailer brake control system/method for controlling the trailer brake application forces to prevent, arrest or minimize and provide rapid recovery from trailer swing events.

While the present invention has been described with a certain degree of particularity, it is understood that the detailed description of the preferred embodiments is by way of example only and that numerous modifications and rearrangements of the components/steps thereof is possible without departing from the spirit and the scope of the present invention as hereinafter claimed.

We claim:

1. A trailer anti-swing brake control method for articulated vehicles (10) of the type comprising a tractor (12) and a trailer (14) connected at an articulating connection (34/176) defining a pivot axis (176) about which the trailer is pivotable relative to the tractor, a tractor brake system, a trailer brake system, a driver operated brake effort demand device (76/78) for providing a demand input signal indicative of the magnitude of operators demand for vehicle braking, trailer brake control means (174) responsive in at least one operating mode for causing the trailer brake system to be applied with an operating force generally proportional to the magnitude of said demand input signal, said control method characterized by:

sensing (260) and/or calculating a value indicative of trailer transverse movement and of a time derivative thereof and providing at least one input signal indicative thereof;

receiving and processing said input signals (70) according to predetermined logic rules to detect the existence of conditions indicative of at least one of incipient and initial trailer brake induced trailer swing events and generating command output signals in response to detection of the existence of said conditions; and responding (174) by said control means to said command output signals by causing the trailer brake system brakes to be applied with a substantially reduced force (210-212) regardless of the magnitude of said demand input signal for a period of time (T) and then causing said trailer brake system brakes to be reapplied (214-216) at a selected rate (R) to a selected maximum reapplication force (P), said selected maximum reapplication force having a magnitude considerably smaller than the maximum trailer brake system brake application force (208-210), said selected maximum reapplication force (P) being a function of, and varying inversely with, the magnitude of the absolute value of said time derivative.

2. The control method of claim 1 wherein said period of time is in the range of about 0.50 to 0.75 seconds.

3. The control method of claim 1 wherein said period of time is in the range of about 0.25 to 1.25 second.

4. The control method of claim 3 wherein said period of time is in the range of about 0.50 to 0.75 second.

5. The control method of claim 1 additionally comprising sensing the direction of vehicle turning; and said processing said input signals to determine the existence of said conditions comprises (i) sensing that the operator has demanded at least partial braking, (ii) sensing that the direction of turning and said at least one time derivative are in opposite directions and (iii) sensing that the absolute value of said at least one time derivative exceeds the absolute value of a predetermined reference value.

6. The method of claim 5 additionally comprising sensing a value indicative of the turning radius of said vehicle, said reference value is a function of said value indicative of said turning radius.

7. A trailer anti-swing brake control system for articulated vehicles (10) of the type comprising a tractor (12) and a trailer (14) connected at an articulating connection (34/176) defining a pivot axis (176) about which the trailer is pivotable relative to the tractor, a tractor brake system, a trailer brake system, a driver operated brake effort demand device (76/78) for providing a demand input signal indicative of the magnitude of operator demand for vehicle braking, trailer brake control means (174) responsive in at least one operating mode for causing the trailer brake system to be applied with an operating force generally proportional to the magnitude of said demand signal, said control system characterized by:

means (260) for sensing and/or calculating a value indicative of trailer transverse movement and of a time derivative thereof and for providing at least one input signal indicative thereof;

means (70) for receiving and processing said input signals according to predetermined logic rules to detect the existence of conditions indicative of at least one of incipient and initial trailer brake induced trailer swing events and for generating command output signals in response to detection of the existence of said conditions; and means for responding to said command output signals to cause said control means to cause the trailer brake system brakes to be applied with a substantially reduced force (210-212) regardless of the magnitude of said demand signal for a determined period of time (T) and then causing said trailer brake system brakes to be reapplied (214-216) at a determined rate (R) to a determined maximum reapplication force (P), said determined maximum reapplication force having a magnitude considerably smaller than the maximum trailer brake system brake application force (208-210) said predetermined maximum reapplication force (P) being a function of, and varying inversely with, the magnitude of the absolute value of said time derivative.

8. The system of claim 7 wherein said sensing is by a sensor (260) mounted on said trailer.

9. The control system of claim 7 wherein said determined time is in the range of about 0.25 to 1.25 second.

10. The control system of claim 9 wherein said predetermined time is in the range of about 0.5 to 0.75 second.

11. The control system of claim 7 additionally comprising sensing the direction of vehicle turning; and said processing said input signals to determine the existence of said conditions comprises (i) sensing that the operator has demanded at least partial braking, (ii) sensing that the direction of turning and said at least one time derivative are in opposite directions and (iii) sensing that the absolute value of said at least one time derivative exceeds the absolute value of a predetermined reference value.

12. The control system of claim 11 additionally comprising means for sensing a value indicative of the turning radius of said vehicle, said reference value is a function of said value indicative of turning said radius.

* * * * *